United States Patent [19]
Tom

[11] Patent Number: 5,956,808
[45] Date of Patent: Sep. 28, 1999

[54] REMOVABLE ROTARY KNOB COVER

[76] Inventor: Anita Lee Tom, 684 Funston Ave., San Francisco, Calif. 94118

[21] Appl. No.: 08/893,358

[22] Filed: Jul. 16, 1997

[51] Int. Cl.$^6$ ..................................................... A47B 95/02
[52] U.S. Cl. .............................................................. 16/121
[58] Field of Search ................................. 16/121, 114 R; 137/382, 377; 292/DIG. 8, DIG. 65, 348, 347, 351, 288; 70/455, 232, DIG. 58, 178, 169, 173

[56] References Cited

U.S. PATENT DOCUMENTS

1,742,090  12/1929  Ornberg ................................ 70/455 X

*Primary Examiner*—Lynne A. Reichard
*Assistant Examiner*—David E. Bochna
*Attorney, Agent, or Firm*—Risto A. Rinne, Jr.

[57] ABSTRACT

A removable apparatus used to cover a knob is provided that includes an inner casing and an outer casing, both of which together form a collar that surrounds a portion of the knob and in so doing mechanically decouples a rotary motion that is applied to the cover from the knob. Disposed intermediate the inner casing and the outer casing is provided a latching mechanism which secures a hinged door to the cover. Release of the latching mechanism requires a two-step procedure beginning with the simultaneous application of a sufficient vertical force applied to urge a pair of vertical slide members downward. The downward force must be maintained in order for the second step to be accomplished. After the pair of vertical slide members have been urged downwards the application of a sufficient horizontal (sideways) force is applied to urge a horizontal slide member to move horizontally causing the release of the latching mechanism Each of the three required forces are applied by a separate digit, preferably of the same hand. Upon release of the latching mechanism the hinged door is opened and the cover is readily removed from the knob. Application of the cover over the knob consists of first sliding the cover over the knob while the hinged door is open and then closing the hinged door when the cover is properly positioned about the knob.

18 Claims, 5 Drawing Sheets

REMOVABLE ROTARY KNOB COVER

BACKGROUND OF THE INVENTION

1. Field of the Invention

The present invention, in general, relates to protective covers that are used with rotary types of knobs and, more particularly, to such devices that prevent undesired access to a faucet, stove, or door knob.

Valves, which control the flow of a liquid or a gas, require a method to manipulate the setting of the valve. Often a rotary type of a knob is attached to the valve in such a manner that when the knob is turned the interior setting of the valve is affected. If access to a valve having a knob is to be restricted then one way to accomplish that is by restricting access to the knob. Examples of such types of knobs include stove (gas or electric), and faucet knobs.

Rotary knobs are used to regulate latches as well. A common example is a rotary door knob that is turned (rotated) to loosen the latch that secures a door in place. There are times when it is desirable to prevent turning a door knob such as when small children are to be safely contained in a particular area. In such a circumstance the particular door that is to be secured may not have a locking mechanism associated with it. One way to impede opening the door is to bar access to the door knob.

The field of the invention, as it applies to knobs which regulate faucets, is examined in greater detail below.

Small children placed in a bathtub, if temporarily left unattended, may be inclined to touch and manipulate the faucet knobs. If the hot water knob is opened the danger of scalding is at once realized. If the hot water is allowed to flow for an extended period of time into the tub, there arises the danger of elevating the overall water temperature sufficient so as to overheat the core temperature of the child thus producing, in the worst case scenario, a potentially life threatening situation. There is also the danger that the child might recoil in shock arising from contact with the hot water and possibly sustain a physical injury as a result of an impact so generated.

Similarly, if the cold water knob is opened there is danger that a child might recoil in shock arising from contact with the cold water and possibly become injured. If the flow of cold water is allowed to continue, there arises the danger of decreasing the overall water temperature a sufficient amount so as to decrease the core temperature of the child thus once again producing, in the worst case scenario, a potentially life threatening situation.

There are also other forms of damage that can arise from a prolonged flow of running water. Perhaps the least damaging of these involves the cost associated with the excessive use of water. There is a cost associated with the delivery of water that is generally proportionate to the quantity of water delivered. Thus an excessive use of water is financially wasteful.

During periods of drought, an excess consumption of water is also wasteful of a most precious resource, the water itself. During such times and in such places where the conservation of water is warranted, it is desirable to prevent the inadvertent use of water, such as would occur if either the hot or the cold (or both) faucet knobs were improperly opened and left running.

There is also the danger that an overflow condition can occur possibly spilling water out of the tub and onto the floor and surrounding structures. It is well known that water damage, caused by leakage, spillage, or flooding, can be a substantial cause for loss, as any insurance company can affirm.

Very young children lack the mental discernment to appreciate and consider the potential consequences of their actions. So do those with developmental delays as well as those who suffer from degenerative diseases, such as Alzheimer's. In addition memory and cognitive functioning loss can occur in people of all ages due to brain damage arising from various disease processes or from physical trauma to the brain.

While the undesired opening of faucet knobs of a bathtub have been discussed, many of the above reasons apply equally well to other types of faucet knobs, such as those associated with water fixtures of any type, for example those of a sink or laundry wash basin. There are times when the unauthorized use of these types of water fixtures also needs to be prevented.

All of these circumstances are ameliorated by the use of a protective cover that is placed over the faucet knob, providing the protective cover either sufficiently hinders or totally prevents the operation of the faucet knob that it covers.

However, there are a couple of requirements, not obvious at first consideration, that must also be satisfied. It is necessary, as a first requirement, that the protective cover be readily removable and also readily applicable by a caregiver. The caregiver may be a child's parent, or in a reversal of roles the caregiver may be an elderly parent's child, or in general any person that is administering to another human being having special needs. If a lengthy assembly or disassembly process is required either to install or to remove the protective cover, it will not be practical for use and, accordingly, it will not be a well accepted product.

Therefore the protective cover must be both readily removable and readily attachable when desired. There exists another requirement that an ideal rotary knob cover must have. It must be readily removable by the caregiver but pose as nearly an insurmountable quandary to the person to whom access to the faucet knob is to be denied as is possible.

As a second requirement of the ideal rotary knob cover, there is a much more difficult problem to be overcome, the solution of which is anything but obvious. The mechanical configuration for an ideal rotary knob cover, while being easy for a caregiver to remove must then, at the same time, be difficult to remove by both small children as well as by those adults with special needs whose mental acuity has in some way been sufficiently diminished so as to warrant restricted access to the knob that is protected by the rotary knob cover.

It is also desirable at times to consider that the faucet knob or knobs (hot, cold, or a combination of both) may be set to flow at a particular rate, in which case it is desirable to prevent any tampering in the settings which could affect either the rate of flow or the temperature setting. As an example, if a small child is placed in a partially filled tub after the water temperature flowing from the faucets has been properly set, it may be desirable to allow water to flow at that temperature setting for a period of time to fill the tub. It would be potentially dangerous in this situation if the child were to tamper with the faucets and change the temperature setting.

Another need that exists is the ability to restrict access to only one of a pair of faucet knobs. If, for example, the concern for scalding exists while at the same time there is also a need to provide access to drinking waters it may be desirable to provide access to the cold water faucet knob and to deny access to the hot water faucet knob.

It should be apparent that the unauthorized tampering of other types of rotary knobs, such as those which control the setting of either a gas or an electric range (stovetop), also pose a safety hazards one that can potentially impact others in the household as well. A gas explosion arising from the prolonged partial opening of a gas stove valve is indeed a serious consequence as is a fire induced by the improper manipulation of the knob of an electric range.

Similarly if the mentally infirm or small children are allowed to open a door and to exit from a secure area by turning the door knob a potential danger to their well-being arises.

Accordingly there exists today a need for a removable rotary knob cover that is easy to apply and remove by a caregiver and yet which is difficult to remove by the person for whom access is to be restricted and that, when applied, impedes access to and a subsequent changing of the setting of the knob. Clearly, such an apparatus is a useful and desirable device.

2. Description of Prior Art

Rotary knob covers are, in general, known. For example, the following patents describe various types of these devices:

U.S. Pat. No. 1,729,425 to, Helrich, Sep. 24, 1929;
U.S. Pat. No. 3,199,121 to Greto, Aug. 10, 1965;
U.S. Pat. No. 5,363,720 to Sanchez, Nov. 15, 1994;
U.S. Pat. No. 5,597,101 to Hoffman et al., Jan. 28, 1997;
U.S. Pat. No. Des. 283,246 to Jack, Apr. ,1 1986;
U.S. Pat. No. Des. 290,990 to Izzi, Jul. 21, 1987; and
U.S. Pat. No. Des. 317,497 to Mast, Jr., Jun. 11, 1991.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a removable rotary knob cover that is easy to apply to a rotary knob by a caregiver.

Another object of the invention is to provide a removable rotary knob cover that is easy to remove from a rotary knob by a caregiver.

Still another object of the invention is to provide a removable rotary knob cover that is difficult to remove from a rotary knob by a person for whom access to the rotary knob is intended to be restricted.

Yet another object of the invention is to provide a removable rotary knob cover that impedes accomplishing a change in the setting of a rotary knob about which it is applied.

Still another important object of the invention is to provide a removable rotary knob cover that impedes infants and very small children from having access to a rotary knob about which it is applied.

Still yet another important object of the invention is to provide a removable rotary knob cover that impedes those people whom are experiencing a sufficient degree of mental infirmity so as to question their ability to exercise prudent judgments from having access to a rotary knob about which it is applied.

Still yet a most important object of the invention is to provide a removable rotary knob cover that first recognizes and then utilizes an inherent correlation between physical ability and mental ability so that a decreasing level of mental acuity produces a resultant change in physical ability, that change in physical ability being utilized by the removable rotary knob cover to provide a threshold level below which removal of the rotary knob cover becomes difficult for a person, regardless of age, to accomplish.

Another especially important object of the invention is to provide a removable rotary knob cover that does not require making a modification to a knob.

Still another especially important object of the invention is to provide a removable rotary knob cover that does not require making a modification to a fixture surface.

Still yet another especially important object of the invention is to provide a removable rotary knob cover that requires a two-step procedure to remove the cover from a knob.

Briefly, a removable rotary knob cover that is constructed in accordance with the principles of the present invention has an inner casing and an outer casing, both of which together form a collar that surrounds a portion of a rotary knob and in so doing mechanically decouples a rotary motion that is applied to the cover (the collar) apart from the knob. Disposed intermediate the inner casing and the outer casing is provided a latching mechanism which secures a hinged door in a closed position of the cover. Release of the latching mechanism requires a two-step procedure beginning with the simultaneous application of a sufficient vertical force applied to urge a pair of vertical slide members downward. The downward force must be maintained in order for the second step to be accomplished. After the pair of vertical slide members have been urged downward the application of a sufficient horizontal (sideways) force is applied to urge a horizontal slide member to move horizontally. Each of the three required forces are applied by a separate digits preferably of the same hand. Release of the latching mechanism allows for the opening of the hinged door which, in turn, allows for either the removal of the cover from the knob or the application of the cover around the knob.

DETAILED DESCRIPTION OF THE INVENTION

Figure 1:
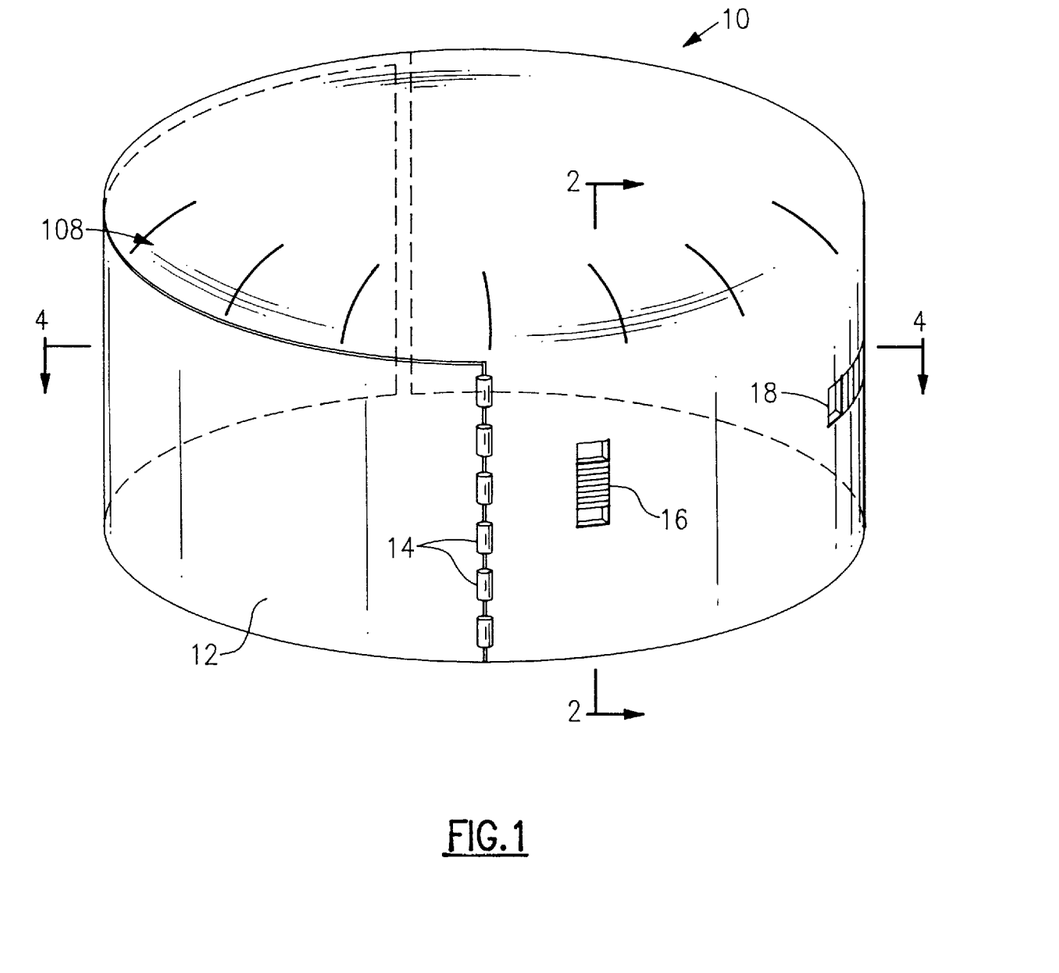
FIG. 1 is a view in perspective of a removable rotary knob cover which shows a door of the cover disposed in a closed position.

Referring on occasion to all of the FIG. drawings and in particular to FIG. 1 is shown, a removable rotary knob cover, identified in general by the reference numeral 10.

A door 12 is pivotally connected to the cover 10 by a hinge 14. The door 12 extends in an arc that encompasses approximately one-half the circumference of the cover 10 FIG. 2 shows details of the remaining half of the cover 10 A first vertical slide member 16 and a horizontal slide member 18 are shown attached to the cover 10.

Figure 2:
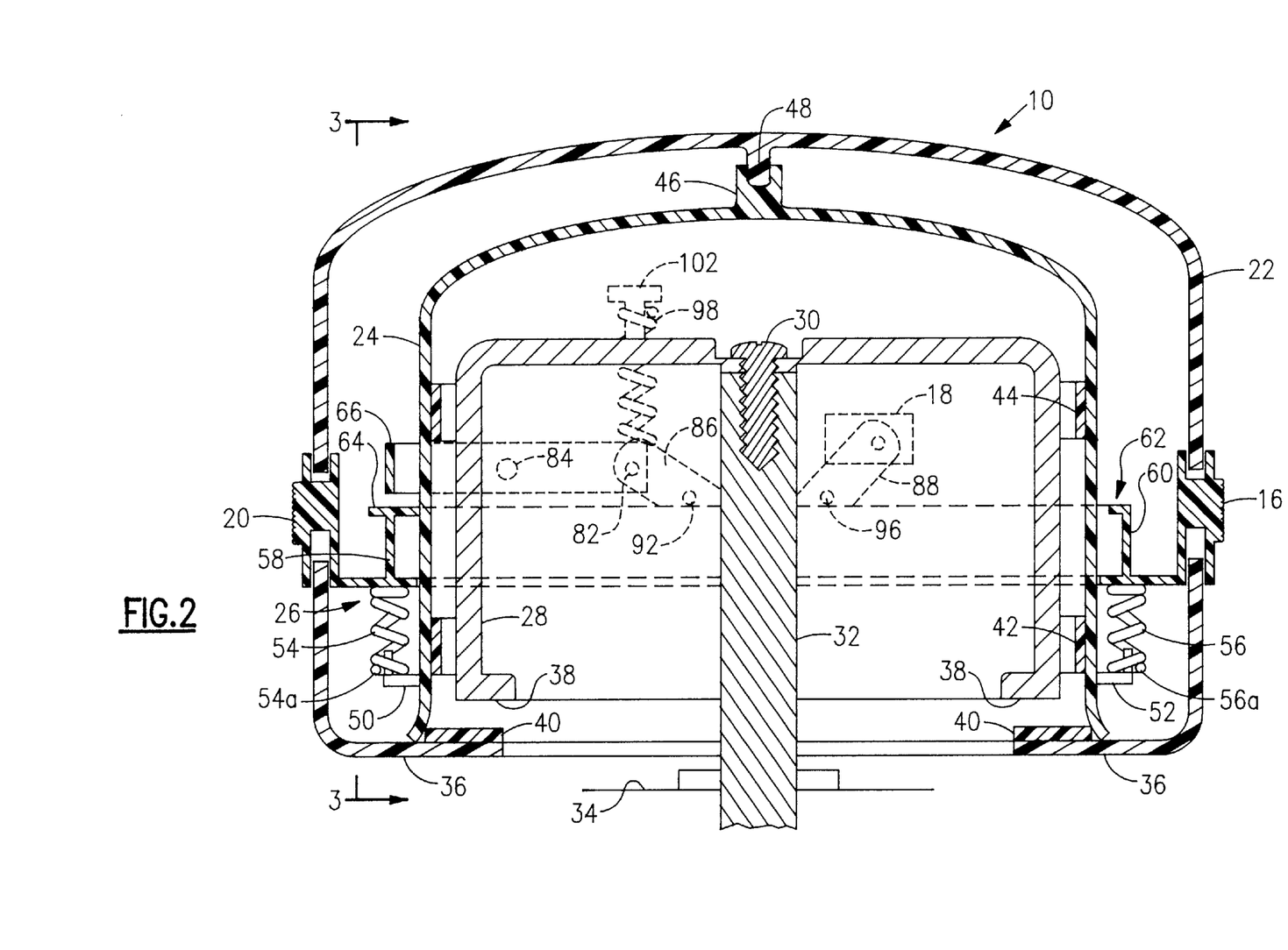
FIG. 2 is a cross sectional view taken along a plane as defined by the pair of lines 2—2 in FIG. 1 which reveals additional details of construction of a removable rotary knob cover and which also shows a portion of a faucet knob contained within the cover.

Referring to FIG. 2, a second vertical slide member 20 is attached to the cover 10 and is disposed on the opposite side with respect to the first vertical slide member 16. The cover 10 includes an outer casing 22 and an inner casing 24, the inner casing 24 being generally similar in shape to the outer casing 22 but smaller. Both the inner casing 24 and the outer casing 22 are themselves each comprised of a half section 24a, 22a, and 22b, 24b that form, respectively, a portion of the door 12 and the remainder of the cover 10. Additional detail is shown in the FIG. 4 drawing.

Disposed between the outer casing 22 and the inner casing 24 is a space which extends radially around the inner circumference of the cover 10. For purposes of clarity the space appears larger than required to better reveal details of the component parts disposed therein, as are described in greater detail hereinbelow.

A latching mechanism, identified in general by the reference numeral 26, is disposed in the space. The latching mechanism 26 is discussed in greater detail hereinbelow and is shown in greater detail in the FIG. 3 drawing.

A faucet knob 28 is shown disposed in the central area of the cover 10 inside the inner casing 24. The faucet knob 28 includes a screw 30 which secures it to a valve stem 32. As the faucet knob 28 is turned this causes the valve stem 32 to also turn and, accordingly, to regulate the flow of water through a valve mechanism (not shown). A fixture surface 34 is disposed under the cover 10 and under the faucet knob 28.

A lower lip 36 extends radially around the perimeter of the outer casing 22 and is, during application of the cover 10 about the faucet knob 28 disposed intermediate a bottom lip 38 of the faucet knob 28 and the fixture surface 34. In its entirety the lower lip 36 includes a first lower lip side 36a and a second lower lip side 36b that are separated from each other and are each attached to the door 12 and to the remainder of the cover 10, respectively (See FIG. 4 momentarily). The cover 10, when applied over the knob 28, completely surrounds the visible portion of the knob 28 as well as the bottom lip 38 of the knob 28.

A friction reducing ring 40 is attached to the lower lip 36, if desired, to reduce friction between the lower lip 36 of the outer casing 22 and the bottom lip 38 of the knob 28. The friction reducing ring 40 is formed of Teflon or of any other suitable material producing a sufficiently low coefficient of friction between the cover 10 and the knob 28. The friction reducing ring 40 is also comprised of a first friction reducing ring half 40a and a second friction reducing ring half 40b, each attached to the first lower lip side 36a and the second lower lip side 36b, respectively. (See FIG. 4 momentarily).

Figure 4:
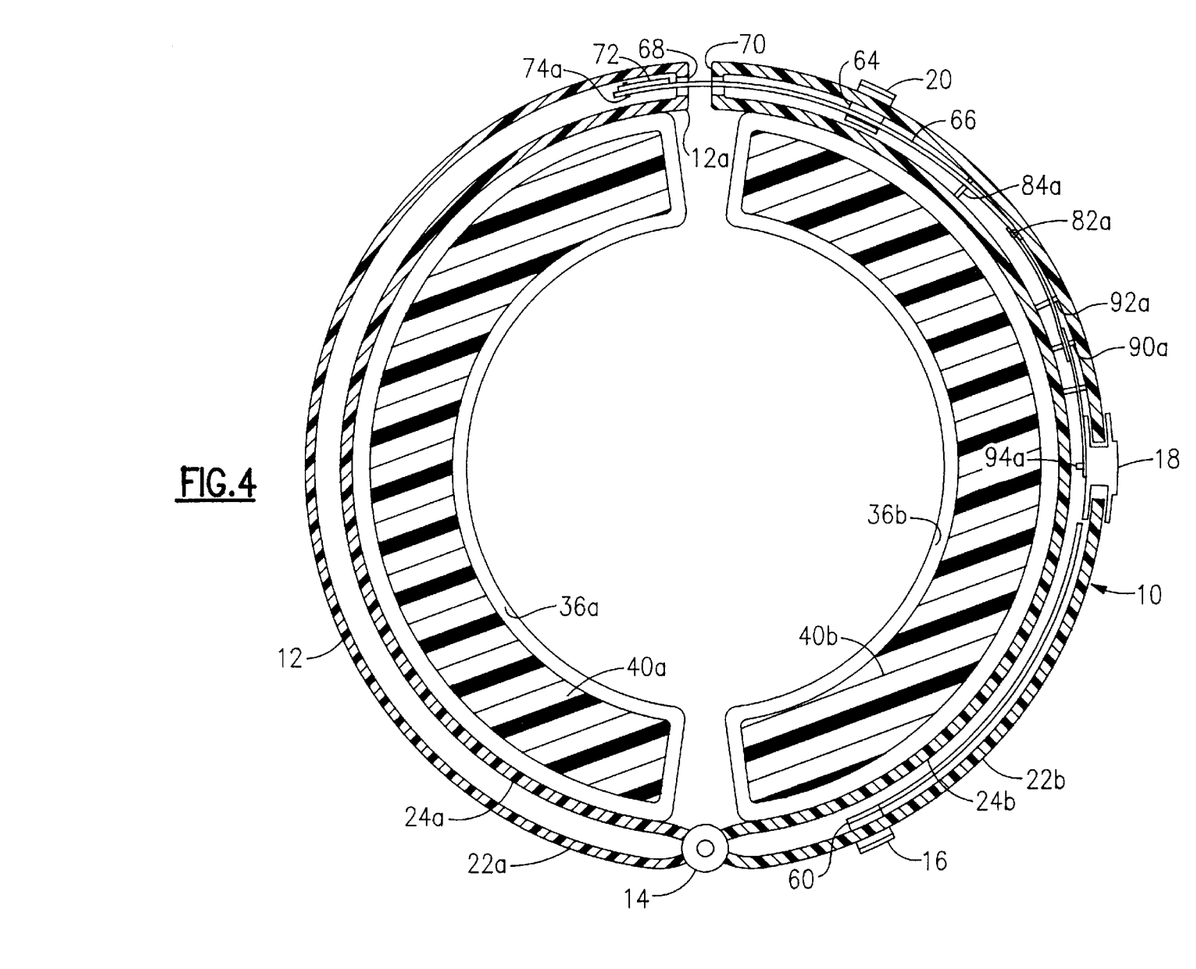
FIG. 4 is an enlarged cross sectional view taken on the line 4-4 in FIG. 1 which better reveals the curved nature of the latching mechanism.
Figure 5:
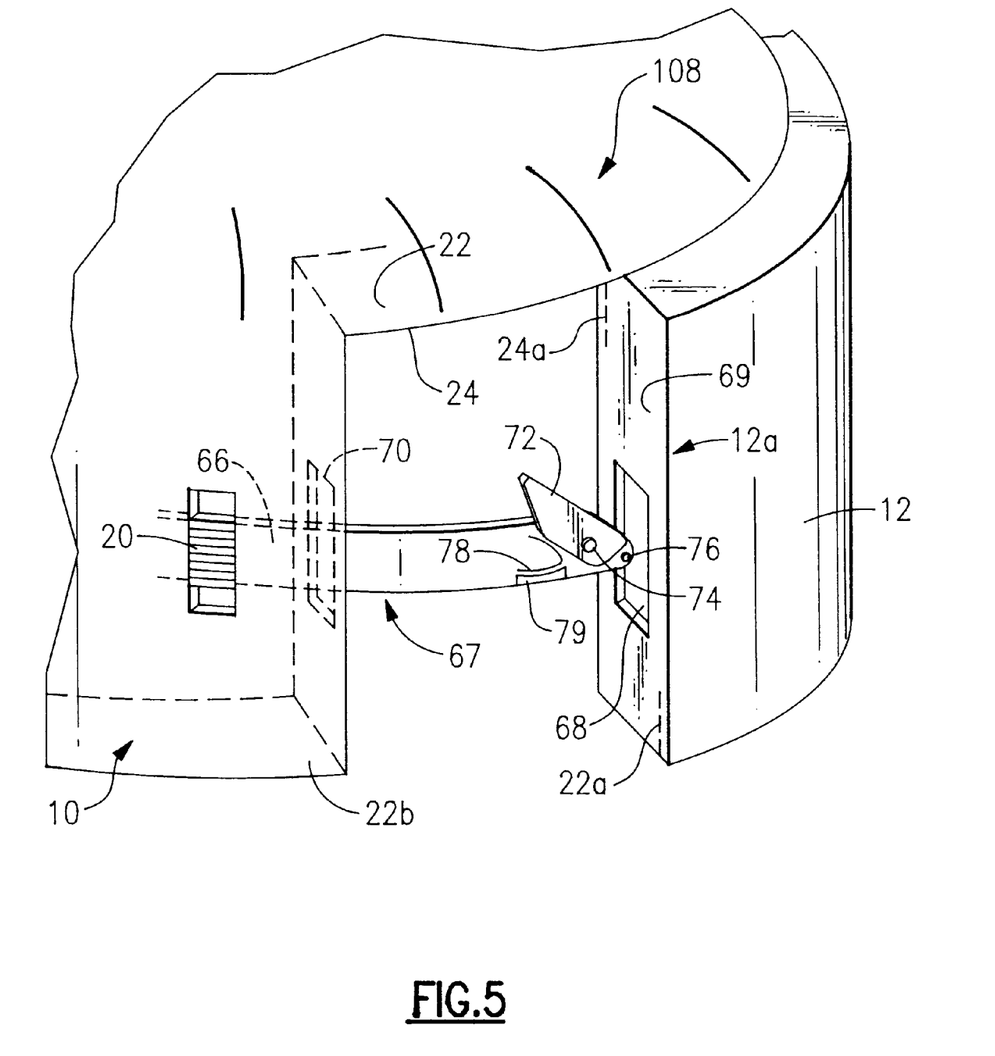
FIG. 5 is a view in perspective of the engagement of the latching mechanism with the hinged door of the cover, the door being shown in a partially open position.

A second friction reducing ring 42 and a third friction reducing ring 44 are attached, if desired, to the inside surface of the inner casing 24 to further reduce friction between the cover 10 and the knob 28. The second friction reducing ring 42 and the third friction reducing ring 44 each extend in a ring around the inner surface of the inner casing 24 contiguously, except for a break in continuity at the hinge 14 end of the door 12 and a break in continuity at a remaining end 12a (See FIG'S. 4 and 5.) of the door 12.

In use, the cover 10 rests around the knob 28 without attachment thereto. The cover 10 usually rests directly upon the fixture surface 34 with the knob 28 disposed therein. The cover 10 can, alternatively, rest upon the top of the knob 28 itself, providing that the lower lip 36 extends under the bottom lip 38 of the knob 28. The cover 10 thus forms a collar (not identified with a specific reference numeral) that surrounds the knob 28.

The collar, as is provided by the cover 10, can be rotated without affecting the setting of the knob 28. It is possible to either lift or to laterally move the cover 10 in such a manner that it makes contact with knob 28. The lower lip 36 and the inner casing 24, in concert with the knob 28, have a sufficiently low coefficient of friction so as to prevent any subsequent rotary motion, which may be supplied to the cover 10, from rotating the knob 28.

If it is found that there is a unacceptable tendency for the knob 28 to rotate while experiencing a forced contact with the cover 10, any combination of the friction reducing ring 40, the second friction reducing ring 42, and the third friction reducing ring 44 may be used to further reduce the coefficient of friction between the cover 10 and the knob 28. The intent is for the cover 10 to decouple rotary motion from the knob 28.

It should also be remembered that the group for whom the cover 10 is intended for use namely infants, small children, and those with cognitive delays and other types of mental disorders, are not likely to comprehend that a sustained and forced contact between the cover 10 and the knob 28 coupled with a simultaneous rotary motion applied to the cover 10 can affect the setting of the knob 28. It is not likely either that they will have the physical dexterity to attempt any such manipulation of the cover 10.

The top center portion of the inner casing 24 includes a first protrusion 46 having an opening disposed in the end that is disposed furthest away from the inner casing 24. A second protrusion 48 is attached to the outer casing 22 that fits into the opening of the first protrusion 46 thus aligning the inner casing 24 in a concentric position relative to the outer casing 22.

Figure 3:
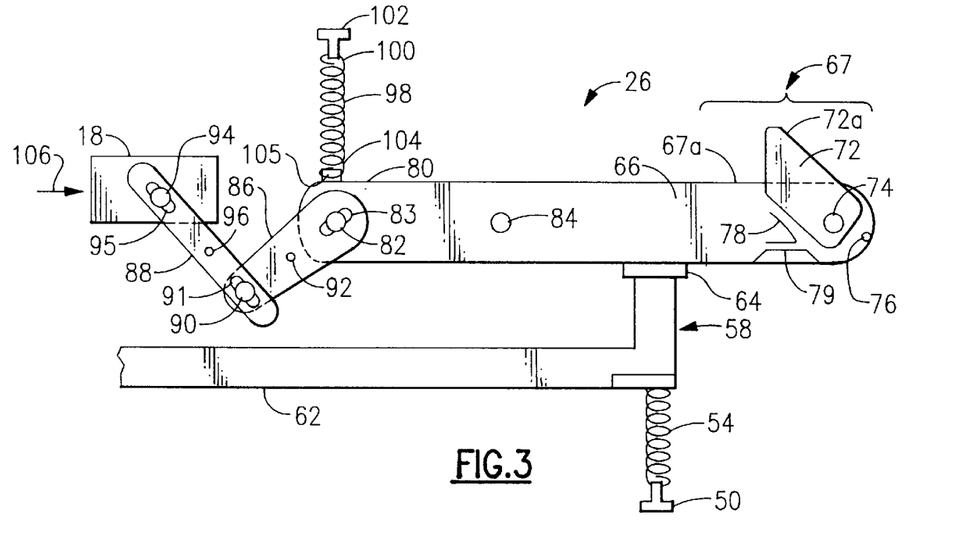
FIG. 3 is a cross sectional view taken along a plane as defined by the line 3—3 in FIG 2. However the plane defined by line 3—3 is intended to curve in a radius around the inside of the removable rotary knob cover thus revealing details of construction of a latching mechanism, which follows the same general curvature and is disposed therein. In this particular view the latching mechanism, as shown, appears to be two dimensional (flat) to provide greater detail as to its construction, however in reality it too is curved to fit inside the interior space of the cover.

During the following discussion it may be helpful to also occasionally refer to FIG. 3. A first retaining pin 50 and a second retaining pin 52 are attached to the outer surface of the inner casing 24 and form a retaining means for a first spring 54 and a second spring 56, at a first spring end 54a and at a second spring end 56a. The first spring 54 and the second spring 56 each supports respectively, a first-end 58 and a second-end 60 of a U-shaped latch support member 62 that extends in an arc around the space between that portion of the inner casing 24 and the outer casing 22 as shown in the FIG. 2 drawing. The first-end 58 and the second-end 60 of the U-shaped latch support member 62 represent the end view of these surfaces and, accordingly, they do not extend beyond the portion of the cover 10 as shown in FIG. 2 nor do they extend into the area of the cover occupied by the door 12.

The first-end 58 of the latch support member 62 includes an upper platform 64 which forms a support surface upon which the first latching member 66 is normally in contact, except during release of the latching mechanism 26. The U-shaped latch support member 62 is normally extended upwards as shown in FIG. 2 by the force of the first spring 54 and the second spring 56 into contact with the bottom surface of the latch support member 62. The range of motion of the latch support member 62 and the U-shaped latch support member 52 are described in greater detail hereinbelow in the section entitled "Operation".

A latch member portion, identified in general by the reference numeral 67, represents a forward portion of the first latching member 66 that does extend beyond the portion of the cover 10 that is shown in the FIG. 2 view and enter into a first opening 68 of the door 12. (See also FIG'S 3, 4, and 5.)

The first opening 68 is disposed in a door end 69 that is disposed on the opposite end of the door 12 as compared to where the hinge 14 is attached The door end 69 is attached on either side thereof to the half sections 24a, 22a of the inner casing 24 and outer casing 22 respectively A second opening 70, (See FIG. 5.) that is similar in size and shape to the first opening 68 and is disposed adjacent thereto when the door 12 is closed is formed in the cover 10 and provides room for the latch member portion 67 of the first latching member 66 to exit from the cover 10 and to allow for the full range of motion of the first latching member 66 to occur, as is described in greater detail hereinbelow.

Referring now in particular to FIG. 3, the first latching member 66 is shown to rest upon the upper platform 64. This is its normal rest position and is explained in greater detail hereinbelow. Disposed at the latch member portion 67 of the first latching member 66 is a pivot hook 72 that is pivotally attached at a first pivot axis 74 to the latch member portion 67 of the first latching member 66.

The pivot hook 72 is shown in the normally extended position. This position is useful in securing the door 12 to the cover 10. A pivot stop pin 76 is attached to the latch member portion 67 of the first latching member 66 to prevent the pivot hook 72 from pivoting further away from the latch member portion 67.

A third spring 78 rests atop a ledge 79 the ledge 79 being attached to the latch member portion 67. The ledge 79 also includes a means to retain the third spring 78 in place, however the means to retain is not shown to provide better clarity of construction of the important aspects of the cover 10. One possible example of the means to retain includes extending an elevated portion of the ledge 79 so that it covers and thus retains a portion of the third spring 78 while still allowing room for the pivot hook 72 to pivot about the first pivot axis 74 toward the ledge 79 an amount sufficient to allow for a top hook edge 72a of the pivot hook 72 to align with a top member edge 67a of the latch member portion 67. The third spring 78 is a leaf spring that exerts only a minimal force upon the pivot hook 72 sufficient to keep it normally in the extended position.

The first latching member 66 includes an opposite end 80 that is disposed furthest away from the latch member portion 67 of the first latching member 66. The opposite end 80 includes a second pivot axis 82. A third pivot axis 84 is disposed in the first latching member 66 intermediate the first pivot axis 74 and the second pivot axis 82. The first pivot axis 74 includes a first pivot pin 74a (See also FIG. 4.) that serves to pivotally attach the pivot hook 72 to the first latching member 66. A hole is provided through the pivot hook 72 and through the latch member portion 67 of the first latching member 66 for the first pivot pin 74a to pass through in order to provide the first pivot axis 74.

The first pivot pin 74a is not attached to either the inner casing 24 or to the outer casing 22. Although not shown, the first pivot pin 74a must include a method to retain the pivot hook 72 in a position of cooperation with the latch member portion 67. Any preferred method is acceptable for retaining the pivot hook 72 including but not limited to, the use of a pair of E-clips (not shown), threaded nuts (not shown), or enlarged protuberances (not shown) that are each respectively attached to both ends of the first pivot pin 74a.

The second pivot axis 82 and the third pivot axis 84 each include respectively a second pivot pin 82a and a third pivot pin 84a (See also FIG. 4.) as are described in greater detail hereinbelow.

The third pivot pin 84a is attached at one end thereof to the half section 22b of the outer casing 22 and at the remaining end thereof to the half section 24b of the inner casing 24. The third pivot pin 84a passes through a hole provided in the first latching member 66.

An understanding of the construction and attachment of the third pivot pin 84a is aided by a discussion of the preferred technique for the construction of the cover 10 which includes molding the component parts from any preferred type of plastic. It is contemplated that, in particular, the outer casing 22 and the inner casing 24 are to be injection molded components.

Accordingly, design flexibility exists as to the method of attachment used to attach the third pivot pin 84a to the cover 10. For example the third pivot pin 84a may be comprised of a first segment (not shown) attached to the inner casing 24 and a second segment (not shown) that is attached to the outer casing 24 whereby the first segment and the second segment each extend one-half of the distance of the space between the inner casing 24 and the outer casing 22 so that when the inner casing 24 and the outer casing 22 are assembled together the first segment and the second segment abut each other in the center of the space thereby forming a continuum of the third pivot pin 84a between the inner casing 24 and the outer casing 22. Of course, other techniques for construction of the third pivot pin 84a are apparent to those skilled in the art.

The exact method chosen for the construction of the third pivot pin 84a is not as important as is the need to provide a third pivot axis 84 about which the first latching member 66 can pivot while also being retained in a position of cooperation with the third pivot pin 84a. Of course, a hole must be provided through the first latching member 66 for the third pivot pin to pass through.

A second latching member 86 is pivotally attached at one end thereof to the opposite end 80 at the second pivot axis 82 by the second pivot pin 82a. A first slot 83 is provided through the second latching member 86 and a hole is provided through the first latching member 66 to allow for the passage of the second pivot pin 82a. The second pivot pin 82a is similar in design and function to the first pivot pin 74a except that it is pivotally attaching the second latching member 86 to the first latching member 66.

Because of the geometry involved, the second pivot axis 82, unlike the first pivot axis 74, must allow for a lateral change in position between the one end of the second latching member 86 and the opposite end 80 of the first latching member 66. The first slot 83 allows for this motion to occur as the second latching member 86 pivots about a fifth pivot axis 92, as is described in greater detail hereinbelow.

The second latching member 86 is pivotally attached at a remaining end thereof to a first end of a third latching member 88 at a fourth pivot axis 90 by a fourth pivot pin 90a in a manner similar to that described hereinabove by the second pivot pin 82a. The remaining end of the second latching member 86 is disposed on an opposite end with respect to the one end thereof. A hole is provided in the second latching member 86 and a second slot 91 is provided in the third latching member 88 to allow the fourth pivot pin 90a to pass through for the same reason that the first slot 83 is provided in the second latching member 86.

The fifth pivot axis 92 is disposed in the second latching member 86 intermediate the second pivot axis 82 and the fourth pivot axis 90. A fifth pivot pin 92a passes through a hole provided in the second latching member 86. The fifth pivot pin 92a is both constructed and attached to the cover 10 in a manner similar to that as described hereinabove regarding the third pivot pin 84a.

A sixth pivot axis 94 is disposed in a second end of the third latching member 88 the second end being disposed on the opposite end of the third latching member 88 with respect to the first end. A sixth pivot pin 94a is attached to the horizontal slide member 18. The sixth pivot pin 94a passes through a third slot 95 that is provided in the third latching member 88 for the same reason as are the first slot 83 and the second slot 91 provided.

A seventh pivot axis 96 is disposed in the third latching member 88 intermediate the sixth pivot axis 94 and the fourth pivot axis 90. A seventh pivot pin 96a passes through a hole provided in the third latching member 88. The seventh pivot pin 96a is attached to the cover 10 in a manner similar to the fifth pivot pin 92a.

A fourth spring 98 is attached at an upper end 100 to a third retaining pin 102. (See also FIG. 2 which shows the orientation of these component parts in dashed lines indicating that they are hidden from view disposed behind the inner casing 24.) The third retaining pin 102 is attached to the outer casing 22 at a predetermined distance above the second pivot axis 82. The fourth spring 98 is configured so that a lower end 104 thereof engages with the latching mechanism near to the second pivot axis and, preferably, directly above it.

A protuberance 105 is attached to the opposite end 80 of the first latching member 66 to retain the lower end 104 of the fourth spring 98 in a position of cooperation with the first latching member 66. The fourth spring 98 exerts a downward force to the second pivot axis 82, thereby tending to urge both the opposite end 80 of the first latching member 66 and the one end of the second latching member 86 downward.

If desired, additional members (not shown) can be included in the latching mechanism 26 to provide for smoother operation. For example a slide extension member (not shown) may be attached at one end thereof to the horizontal slide member 18 at the sixth pivot pin 94a and to the third latching member 88 at the sixth pivot axis 94 if this was found to improve the operation of the latching mechanism 26 of the cover 10.

Similarly the shape and the geometric positioning of the above described component parts of the latching mechanism 26 may be varied to provide smoother operation. It is well known that mechanical linkages, such as those which comprise the latching mechanism 26 of the cover 10, have a characteristic "feel" associated with their use and that the "feel" of the cover 10 is a design variable that can be affected by making possible changes to the component parts of the cover 10.

For example, a change in the positioning of either the third pivot axis 84, the fifth pivot axis 92, or the seventh pivot axis 96 along the length of the first latching member 66, the second latching member 86, and the third latching member 88 respectively, will change the mechanical advantages involved and therefore change the "feel". Similarly a change in the geometric positioning (the angles) between the first latching member 66, the second latching member 86, and the third latching member 88 will change the "feel" as would a change in the spring constant of either the first spring 54, the second spring 56, the third spring 78, or the fourth spring 98.

Operation

To install the cover 10 about the knob 28 the door 12 is pivoted about the hinge 14 into a fully open position. (FIG. 5 shows the door 12 in a partially open position.) The cover 10 is then slid sideways into position so that it surrounds the knob 28. The door 12 is then gently closed. As the door is closed the top of the first opening 68 makes contact with the top edge of the pivot hook 72a which in turn causes the pivot hook 72 to pivot about the first pivot axis 74 until sufficient clearance is provided for the latch member portion 67 of the first latching member 66 to enter into the first opening 68 of the door 12. Upon closure of the door 12 the pivot hook 72 enters into the door beyond the first opening 68 until it is able to pivot back into the normally extended position, thus securing the door 12 in the closed position.

Figure 6:
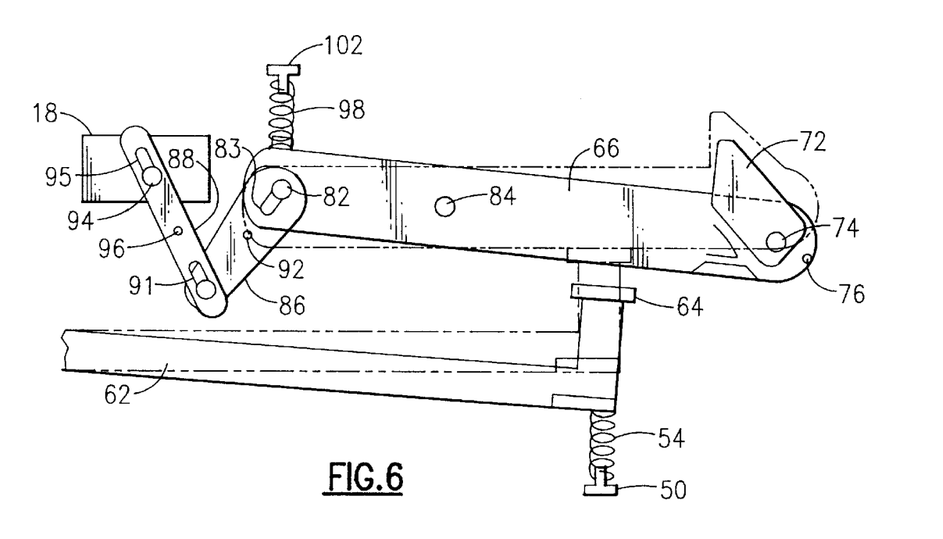
FIG. 6 is a repetition of the view of FIG. 3 showing the latching mechanism disposed in a second, released position and including dashed lines to reveal the normal rest position of some of the component parts for comparison purposes.

It is especially helpful to compare FIG. 3 with FIG. 6 for the following discussion which details the release of the latching mechanism 26. The latching mechanism 26 is disposed in a second position in FIG. 5 which is the position necessary for release to occur. In the second position the latching mechanism 26 does not secure the door 12 and, accordingly, it is possible to open the door 12 and to remove the cover 10 from the knob 28.

To open the door 12 requires a deliberate two-step sequential and coordinated activity involving three digits, preferably of the same hand (though not necessarily of the same hand). In particular, the first step uses the thumb and the middle finger of a caregiver (not shown) to apply a simultaneous force to the first vertical slide member 16 and to the second vertical slide member 20 urging both of them to move downward.

This action is resisted by the first spring 54 and by the second spring 56. Therefore a sufficient downward-directed force must be applied by the caregiver to overcome the resistance supplied by the first spring 54 and by the second spring 56. This action causes the first-end 58 and the second-end 60 of the U-shaped latch support member 62 to move downward thus creating a substantial gap between the upper platform 64 and the bottom of the first latching member 66. The force exerted by the fourth spring 98 maintains the first latching member 66 in position.

It is noted that if the downward force is removed from the first vertical slide member 16 and from the second vertical slide member 20, the force exerted by the first spring 54 and by the second spring 56 will cause the U-shaped latch support member 62 to move upward and to push the first latching member 66 upward as well. The upward range of motion that is possible for the U-shaped latch member 62 is limited. When the top member edge 67a of the first latching member 66 contacts the upper edge of the second opening 70 it cannot go any higher. This limits the upward range of motion for the U-shaped latch support member 62 as well.

Even so this action alone (the downward force applied to the first vertical slide member 16 and to the second vertical slide member 20) is not sufficient to cause a release of the latching mechanism 26 from engagement with the door 12 because the lower end 104 of the fourth spring 98 continues to apply a downward force to the opposite end 80 of the first latching member 66. As a result of the force that is supplied by the fourth spring 98, the first latching member 66 pivots about the third pivot axis 84 which maintains the latch member portion 67 of the first latching member 66 in an upward, or latched, position.

The second step necessary for release of the latching mechanism 26 requires that a third motion be imparted to the cover 10 while the first vertical slide member 16 and the second vertical slide member 20 are held (urged) downward. A horizontal (sideways) force must then be applied to the horizontal slide member 18 in the direction shown by an arrow 106 in FIG. 3 sufficient to urge the horizontal slide member to move in the direction of the arrow 106. Normally the index finger of the same hand is used for this purpose Therefore the thumb and middle finger must maintain a downward force while the index finger applies a simultaneous horizontal force.

It has been found that in general, this physical ability is lacking in small children as well as in those people having cognitive disorders of such a magnitude that they are likely to require supervision or help by the caregiver. Accordingly the latching mechanism 26 provides a correlation between mental ability and physical ability regardless of age making it especially useful for geriatric use as well as for use with small children.

For the latching mechanism 26 to attain the second position as shown in FIG 6, it is necessary to follow the procedure described hereinabove. Therefore for the second position to be attained, both the first vertical slide member 16 and the second vertical slide member 20 must be held down while the horizontal slide member 18 is horizontally displaced in the direction shown by the arrow 106.

The horizontal motion imparted to the horizontal slide member 18 in the direction shown by the arrow 106 causes the third latching member 88 to pivot about the seventh pivot axis 96 in such a direction as to urge the fourth pivot axis 90 downward which, in turn, urges the second pivot axis 82 in an upward direction as the second latching member 86 pivots about the fifth pivot axis 92. As the second pivot axis 82 moves upward the opposite end 80 of the first latching member 66 also moves upward causing a further compression of the fourth spring 98 and also causing the first latching member 66 to pivot about the third pivot axis 84 so that the latch member portion 67 of the first latching member 66 moves in a downward direction. The downward motion of the latch member portion 67 allows the pivot hook 72 to drop below the top of the first opening 68 which in turn allows the door 12 to be opened.

If the force that is applied by the index finger digit to the horizontal slide member 18 is removed, it will return to its normal rest position as shown in FIG'S 1 through 5. The force that is exerted by the fourth spring 98 will cause the first, second, and third latching members 66, 86, 88 to pivot back into their normal rest position which, in turn, displaces the horizontal slide member 18 back into its normal rest position as well. The normal rest position is the "latched" position.

Once the door 12 has been opened, it is pivoted about the hinge 14 into the fully open position and the cover 10 is removed from the knob 28 in reverse order of the procedure by which it was applied, thus exposing the knob 28 for adjustment by a caregiver. If the caregiver desires to reinstall the cover 10 the above described installation procedure is once again followed.

Accordingly a method is provided by the cover 10 to control access to a knob 28. The cover 10 is easy to apply and to remove by a caregiver while at the same time being difficult to remove by the person for whom care is being rendered. In addition no modification to the knob 28 or to the fixture surface 34 is required to use the cover 10. The cover 10 provides a threshold level of physical ability, below which removal of the rotary knob cover becomes difficult for a person, regardless of age, to accomplish.

Of course, if desired, a mirror image rotary knob cover (not shown) can be made and is in particular useful under certain circumstances. The hinge 14 when disposed as shown in the FIG. drawings favors right-hand operation for the hinge appears to the right of the door 12 when the door 12 is viewed from the outside of the cover 10 The mirror image cover would require a modified hinge (not shown) to be disposed on the opposite, or left-hand side, and this would then favor left-hand operation. The cover 10, as shown, would typically be used whenever access to the knob 28 from the left is desired. For example the cover 10 would favor use when the knob 28 is situated on the left-hand side of a water fixture (not shown), the side which usually controls the flow of hot water. The purpose behind offering two such versions is to allow the caregiver to be able to approach the knob 28 from an unobstructed side of the water fixture. Of course the cover 10 may be used with either the hot or the cold water side of a fixture. This discussion merely illustrates that, if desired, the cover 10 can be further modified for more specific applications.

Referring once again to FIG. 3 is shown a cover lip portion of the cover 10, identified in general by the reference numeral 108. The cover lip 108 is an extension of the inner casing 24 and the outer casing 22 which together form a top for the cover 10 and extend over the door 12 when the door 12 is closed. The extension of the inner casing 24 and the outer casing 22 merge together at the cover lip 108 thus eliminating the space that normally exists between these two component parts in this area.

As an alternatives a modified door (not shown) is provided which literally bisects a modified cover (not shown) in half. Accordingly instead of having the door 12 close under the cover lip 108, the modified door would extend up to the top of the modified cover. When the modified door is opened the modified cover is bisected in two. One-half of the top portion of the modified cover remains attached to and pivots in unison with the modified door when the modified door is opened. This approach may be preferred if manufacturing costs such as tooling expenses for the modified cover are not prohibitive, as it provides a larger opening when the modified door is opened. A larger opening makes it easier to install or to remove the modified cover when an especially large type of a knob (not shown) is encountered.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A removable rotary knob cover for use with a rotary knob, comprising:

(a) an outer casing having a predetermined size and shape;

(b) an inner casing having a size and shape smaller than said outer casing and disposed concentrically within said outer casing so as to form a space between said outer casing and said inner casing;

(c) a door pivotally attached to said cover, said door providing access through said outer casing and through said inner casing; and (d) latching means disposed within said space for securing said door in a closed position, wherein said latching means includes a first motion imparted to a pair of vertical slide members in a downward direction followed by a second motion imparted to a horizontal slide member in a horizontal direction.

2. The removable rotary knob cover of claim 1 wherein said latching means includes a U-shaped member, said U-shaped member including support means attached to said inner casing, said support means including means for urging said U-shaped member in an upward vertical direction.

3. The removable rotary knob cover of claim 2 wherein each of said pair of vertical slide members are attached to a first end and to a second end of said U-shaped members respectively.

4. The removable rotary knob cover of claim 3 wherein each of said pair of vertical slide members is disposed in said outer casing to allow for access thereto.

5. The removable rotary knob cover of claim 4 including a first latching member that is pivotally attached to said inner casing and to said outer casing, said first latching member having a latch member portion that is disposed at one end thereof and an opposite end that is disposed at the opposite and with respect to said latch member portions and having a portion of said first latching member intermediate said latch member portion and said opposite end that is disposed generally above said first end of said U-shaped member wherein said U-shaped member is in contact with said portion during a normal state of being latched.

6. The removable rotary knob cover of claim 5 including a second latching member that is pivotally attached to said inner casing and to said outer casing and is pivotally attached at one end thereof to said opposite end of said first latching member and is pivotally attached at a remaining end thereof to an end of a third latching members said third latching member is pivotally attached to said horizontal slide member at a second end thereof that is distally disposed with respect to said end of said third latching member and said third latching member is pivotally attached to said inner casing and to said outer casing.

7. The removable rotary knob cover of claim 6 including means for urging said first latching member, said second latching member, said third latching members and said horizontal slide member into a position producing said normal state of being latched.

8. The removable rotary knob cover of claim 7 wherein said means for urging said first latching member, said second latching members said third latching members and said horizontal slide member includes a spring.

9. The removable rotary cover of claim 7 wherein said first latching member includes a hook that is pivotally attached to said latch member portion, said hook including means for urging said hook into an extended position.

10. The removable rotary cover of claim 9 wherein said means for urging said hook includes a spring.

11. The removable rotary cover of claim 9 wherein said latch member portion is adapted to retain said door in a closed position.

12. The removable rotary knob cover of claim 2 wherein said means for urging said U-shaped member includes at least one spring.

13. The removable rotary knob cover of claim 1 including means for reducing the coefficient of friction between said cover and a knob.

14. The removable rotary knob cover of claim 13 wherein said means for reducing the coefficient of friction includes a friction reducing material that is applied to a lower lip portion of said outer casing, said lower lip portion forming a concentric plane disposed about a vertical axis of said cover.

15. The removable rotary knob cover of claim 13 wherein said means for reducing the coefficient of friction includes a friction reducing material that is applied to the inside surface of said inner casing.

16. The removable rotary knob cover of claim 1 including means for aligning and means for maintaining said inner casing in a concentric orientation with respect to said outer casing.

17. The removable rotary knob cover of claim 1 including a hinge for pivotally attaching said door to said cover.

18. A removable rotary knob cover for use with a rotary knob, comprising:

(a) a casing adapted to cover at least a portion of said rotary knob;

(b) a door pivotally attached to said casing, said door providing access to an interior portion of said casing; and (c) latching means for securing said door in a closed position, said latching means attached to said casing and including a pair of vertical slide members attached to said casing and a horizontal slide member attached to said casing, wherein the release of said latching means includes a first motion imparted to said pair of vertical slide members in a downward direction followed by a second motion imparted to said horizontal slide member in a horizontal direction.

* * * * *